(12) United States Patent
Glaser

(10) Patent No.: US 8,388,708 B2
(45) Date of Patent: Mar. 5, 2013

(54) PROCESS AND DEVICE FOR UTILIZATION OF SOOT IN POX PLANTS

(75) Inventor: Juergen Glaser, Wolfratshausen (DE)

(73) Assignee: Linde Aktiengesellschaft, Munich (DE)

( * ) Notice: Subject to any disclaimer, the term of this patent is extended or adjusted under 35 U.S.C. 154(b) by 1196 days.

(21) Appl. No.: 12/144,851

(22) Filed: Jun. 24, 2008

(65) Prior Publication Data
US 2009/0000191 A1 Jan. 1, 2009

(30) Foreign Application Priority Data
Jun. 26, 2007 (DE) .......................... 10 2007 029 435

(51) Int. Cl.
*C10J 3/46* (2006.01)

(52) U.S. Cl. ......... 48/197 R; 48/211; 48/212; 48/214 A; 48/197 FM; 48/198.3; 48/198.7; 48/76; 48/84; 48/93; 48/94; 48/95; 48/127.9; 48/127.1; 48/203; 48/75; 48/200; 48/201; 252/373; 210/634

(58) Field of Classification Search .......................... None
See application file for complete search history.

(56) References Cited

U.S. PATENT DOCUMENTS

| | | | |
|---|---|---|---|
| 2,665,980 A | 1/1954 | Carkeek | |
| 2,992,906 A | 7/1961 | Guptill, Jr. | |
| 4,315,834 A | 2/1982 | Van Deraerschot | |
| 4,490,251 A * | 12/1984 | Quintana et al. | 210/209 |
| 4,597,773 A * | 7/1986 | Quintana et al. | 48/197 R |

FOREIGN PATENT DOCUMENTS
DE 24 40 472 A1 3/1976

* cited by examiner

*Primary Examiner* — Kaity V. Handal
(74) *Attorney, Agent, or Firm* — Crowell & Moring LLP

(57) ABSTRACT

A process and device for the material utilization of soot from the waste water of a gasification appliance (heavy oil POX) in which a hydrogen- and carbon monoxide-containing (crude synthesis gas) is generated from relatively high-boiling hydrocarbons by partial oxidation, is disclosed. The soot-loaded waste water from the heavy oil POX is mixed with naphtha and is subsequently introduced into a separator (decanter) from which a substantially soot-free water fraction and a substantially water-free naphtha/soot mixture are taken off separately, where the naphtha/soot mixture is fed as feed to a further gasification appliance (naphtha POX), in which appliance predominantly naphtha is converted into a crude synthesis gas by partial oxidation.

12 Claims, 2 Drawing Sheets

PROCESS AND DEVICE FOR UTILIZATION OF SOOT IN POX PLANTS

This application claims the priority of German Patent Document No. 10 2007 029 435.4, filed Jun. 26, 2007, the disclosure of which is expressly incorporated by reference herein.

BACKGROUND AND SUMMARY OF THE INVENTION

The invention relates to a process for the economic utilization of soot from the waste water of a first gasification appliance (heavy oil POX) in which a hydrogen- and carbon monoxide-containing gas (crude synthesis gas) is generated from relatively high-boiling hydrocarbons by partial oxidation, wherein the soot-loaded waste water is mixed with naphtha and is subsequently introduced into a separator (decanter) from which a substantially soot-free water fraction and a substantially water-free naphtha/soot mixture are taken off separately.

In addition, the invention relates to a device for carrying out the process.

Carbon monoxide- and/or hydrogen-containing gas mixtures, termed synthesis gases, are important starting materials for producing a multiplicity of products, such as ammonia, methanol or else synthetic fuels. A process which is widespread in industry by which synthesis gases are generated in synthesis gas plants from hydrocarbons, in particular from relatively high boiling hydrocarbons (heavy oils) is partial oxidation. In this case a generally preheated hydrocarbon-containing feed is reacted with steam and an oxidizing agent in a reaction chamber (POX reactor) at temperatures between 1300 and 1500° C. and pressures up to 150 bar to give a crude synthesis gas which mostly consists of hydrogen ($H_2$), carbon monoxide (CO), carbon dioxide ($CO_2$) and water. The heat required for the reaction is generated by incomplete (partial) oxidation of the hydrocarbons present in the feed. For this, oxygen is fed to the POX reactor in an amount which is insufficient for complete reaction of the hydrocarbons.

In the partial oxidation, in addition to gaseous components, solids are also formed, such as soot and ash, which must be removed from the crude synthesis gas before this can be further treated. The crude synthesis gas exiting from the POX reactor having a temperature above 1300° C. is first cooled and subsequently subjected to water scrubbing. If the crude synthesis gas is cooled in direct contact with water (quenching), already in this process step, a large part of the solids are scrubbed out of the crude synthesis gas and pass into the water used for quenching (quench water). In the water scrubbing, fine purification proceeds in which the solids content of the crude synthesis gas is reduced typically to approximately 1 $mg/m^3$.

The soot removed from the crude synthesis gas represents a valuable raw material, for which reason it is separated off from the waste water generated by quenching and/or water scrubbing and fed to a material utilization and/or energetic utilization. Expediently, the soot is recycled as feed to the POX reactor and there converted to carbon monoxide. The economic efficiency of the soot utilization depends critically on how high the expenditure is for separating off the soot from the waste water, and, if appropriate, for its preparation to form a feedstock.

In order to utilize the soot of a heavy oil POX as material, according to the prior art, the soot-loaded waste water is mixed with naphtha to form a dispersion. Whereas the majority of the ashes present in the waste water remain in the water phase, the soot which is significantly better wetted by naphtha than by water, transfers virtually completely into the naphtha phase. The dispersion is subsequently introduced into a decanter in which it is separated into a soot-containing naphtha fraction and a substantially soot-free water fraction. The soot-containing naphtha fraction is taken off from the decanter and mixed with heavy oil. Since naphtha is virtually twice as expensive as heavy oil, in order to save feed costs, according to the prior art, in a heavy oil POX, the naphtha is separated off again from the dispersion. The naphtha which is thus recovered is recirculated and again used for separating off soot. For separating off naphtha, the dispersion is fed to a distillation column where most of the naphtha is distilled off and taken off overhead. In the bottom space of the distillation column, naphtha which is not distilled off and heavy oil, together with soot and ash collect as bottom product. After the naphtha has been stripped off, the bottom product, diluted with fresh heavy oil, is recycled as feed to the reactor of the heavy oil POX. The soot-free water fraction from the decanter is expanded, wherein light hydrocarbons which are dissolved in the water pass into the gas phase. Both these light hydrocarbons and also the naphtha which is distilled off and stripped off are liquefied by cooling, stored temporarily and later again mixed with soot-loaded waste water. The high expenditure in terms of apparatus and energy on this process considerably increases the capital costs and running costs of the plant.

Just as in a heavy oil POX, in a naphtha POX, a gasification appliance in which a crude synthesis gas is generated from naphtha by partial oxidation, a soot-loaded waste water is produced from which, according to the prior art, the soot is separated off and is recirculated as feed to the POX reactor. Here also, a dispersion is generated from the soot-loaded waste water and naphtha, which dispersion is introduced into a decanter and there separated into a soot-containing naphtha fraction and a substantially soot-free water fraction. The soot-containing naphtha fraction which is taken off from the decanter is subsequently recycled as feed to the reactor of the naphtha POX, whereas the soot-free water fraction is delivered to a waste water treatment plant. The expenditure for the soot recirculation to a naphtha POX is significantly less than in a heavy oil POX, since the naphtha/soot mixture which is taken off from the decanter can be introduced without further treatment into the reactor of the naphtha POX.

If it is necessary to increase the capacity of an existing synthesis gas plant, in order to adapt it to an increasing requirement of amount of synthesis gas which can be generated on site, frequently one or more additional gasification appliances are installed which are of the same type as the gasification appliance of the existing synthesis gas plant. If the existing synthesis gas plant, as gasification appliance, has, for example, a naphtha POX, it is obvious to install a further naphtha POX and operate it in parallel to the existing naphtha POX, since the existing infrastructure for operating the two gasification appliances can be utilized for the most part unchanged. Recently, the prices of naphtha and heavy oil have developed significantly differently from one another, so that the expansion of an existing naphtha-operated synthesis gas plant with a heavy oil POX which can be operated using a significantly cheaper heavy oil is expedient at least when there is the possibility of reducing the capital and running costs of the heavy oil POX compared with the prior art.

It is therefore an object of the present invention to specify a process of the type mentioned at the outset and also a device for carrying out the process which enable the soot produced in a heavy oil POX to be utilized in a more economic manner than is possible in the prior art.

The object in question is achieved according to the invention in terms of the process in that the naphtha/soot mixture is fed as feed to the reactor of a further gasification appliance (naphtha POX), in which appliance predominantly naphtha is converted into a crude synthesis gas by partial oxidation.

Especially when, not only the heavy oil POX, but also the naphtha POX, are being newly installed, it is expedient to combine the soot-loaded waste waters from both plants and to treat them in the same manner as the soot-loaded waste water in a naphtha POX. The process according to the invention therefore provides that the soot-loaded waste water from the naphtha POX together with the soot-loaded waste water from the heavy oil POX is mixed with naphtha and introduced into the decanter.

If, in parallel to an already existing naphtha POX, a heavy oil POX is to be newly installed and operated, expediently the existing appliance for soot recirculation of the naphtha POX is further utilized. Expediently, therefore, in such a case, the soot-loaded waste water from the heavy oil POX is mixed with naphtha and, independently of the soot-loaded waste water from the naphtha POX, is introduced into a second decanter from which a substantially soot-free water fraction and a substantially water-free naphtha/soot mixture are taken off separately, wherein the naphtha/soot mixture is fed as feed to the reactor of the naphtha POX.

During the production of synthesis gas, faults in the naphtha POX can lead to at least a part or even all of the naphtha/soot mixture produced in the treatment of the soot-loaded waste water from the heavy oil POX not being able to be fed as feed to the reactor of the naphtha POX. To avoid, under such operating conditions, the performance of the heavy oil POX having to be reduced in order to match the amount of the naphtha/soot mixture produced to the amount of naphtha/soot mixture usable in the naphtha POX, an expedient embodiment of the process according to the invention provides that the part of the naphtha/soot mixture which is generated by waste water treatment which, owing to a temporary performance reduction of the naphtha POX, cannot be introduced as feed into the reactor of the naphtha POX, is temporarily stored until the operating conditions permit its use in the naphtha POX.

In addition, the invention relates to a device for the material utilization of soot from the waste water of a gasification appliance (heavy oil POX) in which a hydrogen- and carbon monoxide-containing gas (crude synthesis gas) is generated from relatively high-boiling hydrocarbons by partial oxidation having a mixing appliance in which a dispersion can be generated from the soot-loaded waste water from the heavy oil POX and naphtha, and also a separator (decanter) into which the dispersion generated in the mixing appliance can be introduced and from which a substantially soot-free water fraction and a substantially water-free naphtha/soot mixture can be taken off separately.

The object in question is achieved in terms of the device in that it comprises a second gasification appliance (naphtha POX) in which predominantly naphtha is converted by partial oxidation into a crude synthesis gas, in the reactor of which the substantially water-free naphtha/soot mixture can be introduced as feed from the decanter.

If not only the naphtha POX but also the heavy oil POX are new installations, a preferred embodiment of the device according to the invention provides a mixing appliance in which a dispersion can be generated from the soot-loaded waste waters from the naphtha POX and the heavy oil POX and naphtha, which dispersion can be introduced into the decanter.

If in parallel to an existing naphtha POX, a heavy oil POX is to be newly installed and operated, expediently the existing installation is further utilized for soot recycling to the naphtha POX. In this event, an expedient embodiment of the device according to the invention provides that it comprises a second mixing appliance in which a dispersion can be generated from the soot-loaded waste water from the heavy oil POX and naphtha, and also a second decanter, into which the dispersion generated in the second mixing appliance can be introduced and from which a substantially water-free naphtha/soot mixture can be taken off and introduced into the naphtha POX as feed.

In a development of the device according to the invention, it is provided that it comprises a storage appliance for temporary storage of a part of the naphtha/soot mixture which, owing to a temporary performance reduction of the naphtha POX, cannot be introduced into the reactor of the naphtha POX as feed. The storage appliance is preferably dimensioned such that it can receive the entire amount of the naphtha/soot mixture which is produced during a period of one to two days in the heavy oil POX operating at nominal performance.

Hereinafter, the invention will be described in more detail on the basis of two exemplary embodiments shown schematically in the Figures.

DETAILED DESCRIPTION OF THE DRAWINGS

Figure 1:
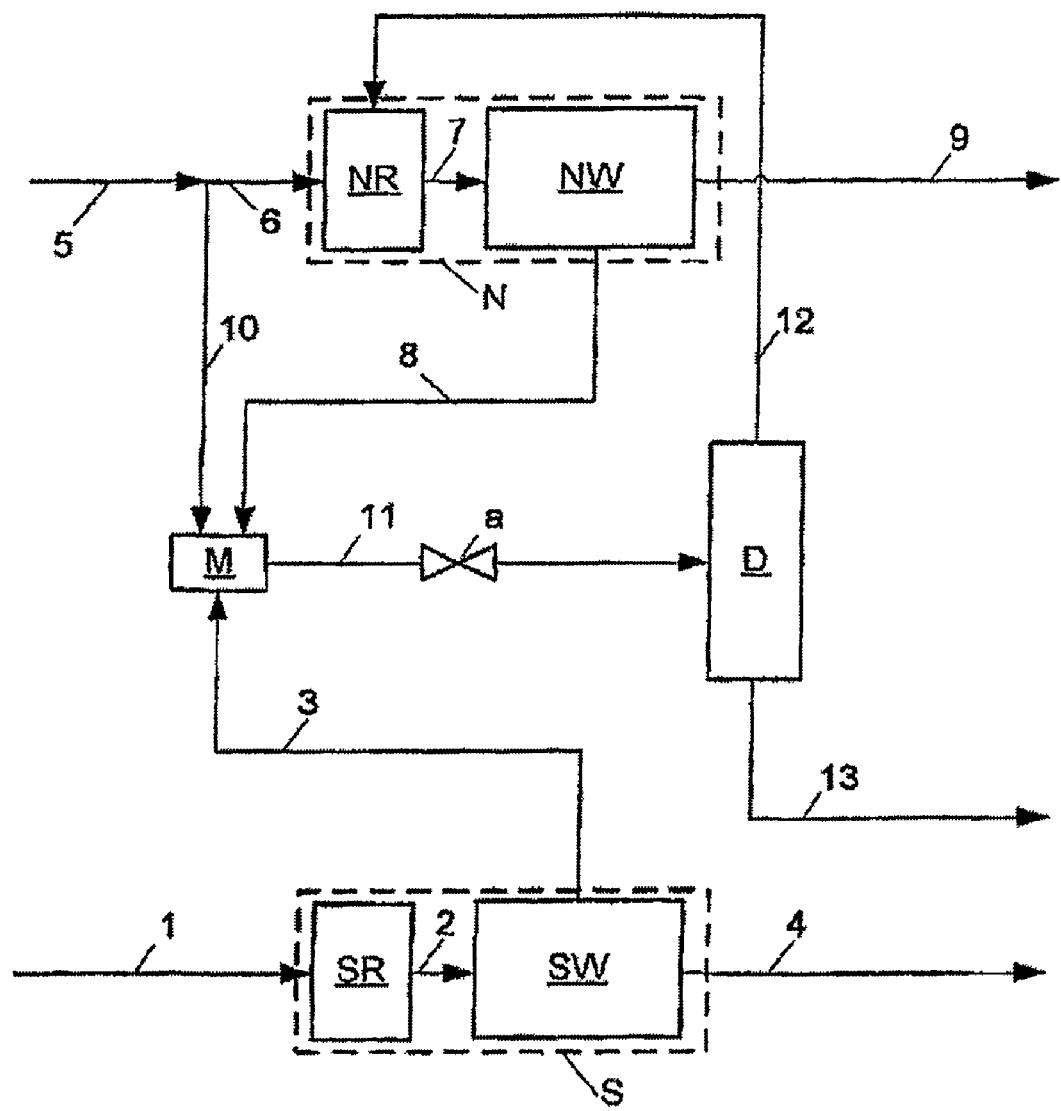
FIG. 1 illustrates a first embodiment of the device and process of the present invention.
Figure 2:
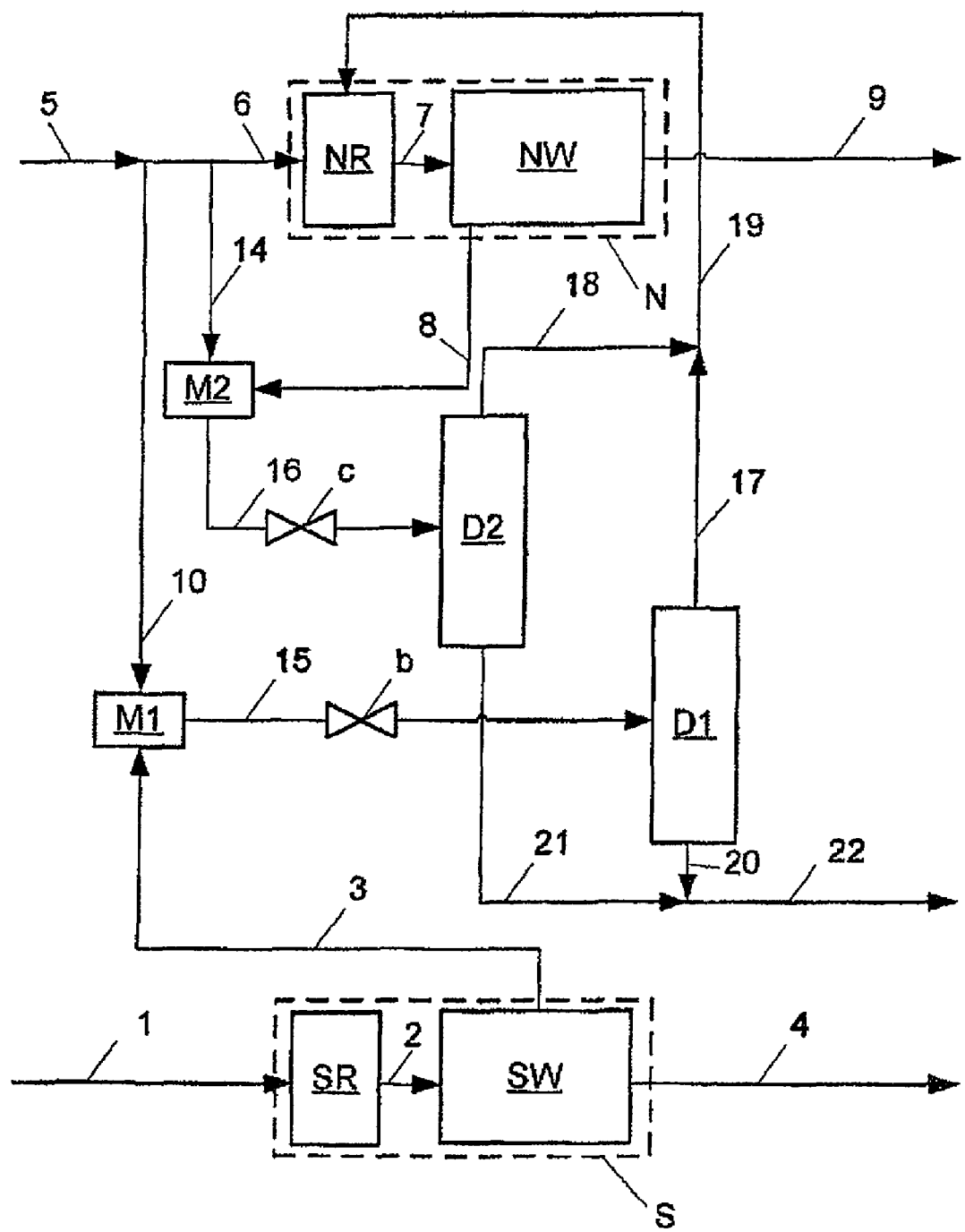
FIG. 2 illustrates a second embodiment of the device and process of the present invention.

In both exemplary embodiments, in each case a device for generating a crude synthesis gas is described which consists of a heavy oil POX (S) and a naphtha POX (N) operated in parallel thereto.

Via line 1, a feed consisting of relatively high-boiling hydrocarbons (heavy oil) is fed to the reactor SR of the heavy oil POX S, which feed is reacted with oxygen and steam by partial oxidation to form a first crude synthesis gas 2 containing primarily hydrogen and carbon monoxide, but also soot. In the scrubbing appliance SW the soot is substantially scrubbed out from the first crude synthesis gas 2 by means of water, wherein a first soot-loaded waste water stream 3 and also a first substantially soot-free crude synthesis gas stream 4 are produced. The soot-loaded waste water stream 3 is subsequently fed to the mixing appliance M.

From the naphtha stream 5, one part 6 is branched off and fed to the reactor NR of the naphtha POX N as feed, where it is reacted with oxygen and steam by partial oxidation to form a second crude synthesis gas 7 containing primarily hydrogen and carbon monoxide, but also soot. In the scrubbing appliance NW, the soot is substantially scrubbed out of the second crude synthesis gas 7 by means of water, wherein a second soot-loaded waste water stream 8 and also a second substantially soot-free crude synthesis gas stream 9 are generated. The second soot-loaded waste water stream 8 is subsequently, together with the naphtha stream 10 which is branched off from the naphtha stream 5, likewise fed to the mixing appliance M.

In the mixing appliance M, a dispersion 11 is generated from the two soot-loaded waste water streams 3 and 8 and also the naphtha stream 10, and introduced via the mixing valve a into the decanter D. After a residence time of typically 2 to 5 minutes, a substantially water-free naphtha/soot mixture 12 is taken off from the top of the decanter D and a substantially soot-free water fraction 13 is taken off from the bottom thereof. The naphtha/soot mixture 12 is recirculated upstream of the naphtha POX N and fed to the reactor NR likewise as feed.

In the second exemplary embodiment, a variant of the invention is shown as is preferably implemented when a heavy oil POX S is newly installed in parallel to an already existing naphtha POX N. For economic reasons, the existing system for treatment of soot-loaded waste water from the naphtha POX N will be retained and operated further.

Via the line 1, a feed consisting of relatively high-boiling hydrocarbons (heavy oil) is fed to the reactor SR of the heavy oil POX S, which feed is reacted with oxygen and steam by partial oxidation to form a first crude synthesis gas 2 containing primarily hydrogen and carbon monoxide, but also soot. In the scrubbing appliance SW, the soot is substantially scrubbed out of the first crude synthesis gas 2 by means of water, wherein a first soot-loaded waste water stream 3 and also a first substantially soot-free crude synthesis gas stream 4 are produced. The soot-loaded waste water stream 3 is subsequently fed to the mixing appliance M1 in which it is mixed with the naphtha stream 10 branched off from the naphtha stream 5 to form a first dispersion 15 which is subsequently introduced via the mixing valve b into the decanter D1.

The substream 6 which is branched off from the naphtha stream 5 is fed to the reactor NR of the naphtha POX N as feed, where it is reacted with oxygen and steam by partial oxidation to form a second crude synthesis gas 7 containing primarily hydrogen and carbon monoxide, but also soot. In the scrubbing appliance NW, the soot is substantially scrubbed out of the second crude synthesis gas 7 by means of water, wherein a second soot-loaded waste water stream 8 and also a second substantially soot-free crude synthesis gas stream 9 are generated. The second soot-loaded waste water stream 8 is subsequently, together with the naphtha stream 14 which is branched off from the naphtha stream 5, fed to the mixing appliance M2 and there converted to a second dispersion 16 which is subsequently introduced via the mixing valve c into the decanter D2.

After residence times of typically 2 to 5 minutes, from the top of the decanter D1 and also from the top of the decanter D2, substantially water-free naphtha/soot mixtures 17 and 18 are taken off, introduced into the line 19 and, together, recycled upstream of the naphtha POX N and applied to the reactor NR likewise as feed. Via the bottom of the decanter D1 and also the bottom of the decanter D2, substantially soot-free water fractions 20 and 21 are taken off and removed via line 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for economic utilization of soot from waste water of a heavy oil POX in which a first crude synthesis gas is generated from relatively high-boiling hydro-carbons by partial oxidation, wherein comprising:

mixing soot-loaded waste water with naphtha and subsequently introducing mixed soot-loaded waste water and naphtha into a decanter, and taking off a substantially soot-free water fraction and a substantially water-free naphtha/soot mixture separately from the decanter, wherein the naphtha/soot mixture is fed as feed to a reactor of a naphtha POX, in which naphtha POX predominantly naphtha is converted into a second crude synthesis gas by partial oxidation.

2. The process according to claim 1, wherein soot-loaded waste water from the naphtha POX together with the soot-loaded waste water from the heavy oil POX is mixed with naphtha and introduced into the decanter.

3. The process according to claim 1, wherein soot-loaded waste water from the naphtha POX is mixed with naphtha and, independently of the soot-loaded waste water from the heavy oil POX, is introduced into a second decanter from which a substantially soot-free water fraction and a substantially water-free naphtha/soot mixture are taken off separately, wherein the naphtha/soot mixture is fed as feed to the reactor of the naphtha POX.

4. The process according to claim 1, wherein a part of the naphtha/soot mixture which, owing to a temporary performance reduction of the naphtha POX, cannot be fed as feed into the reactor of the naphtha POX, is temporarily stored until operating conditions permit its use in the naphtha POX.

5. A device for material utilization of soot from waste water of a heavy oil POX in which a first crude synthesis gas is generated from relatively high-boiling hydrocarbons by partial oxidation, comprising:

a mixing appliance in which a dispersion is generated from soot-loaded waste water from the heavy oil POX and naphtha, a decanter into which the dispersion generated in the mixing appliance is introduced and from which a substantially soot-free water fraction and a substantially water-free naphtha/soot mixture is taken off separately, and a naphtha POX in which predominantly naphtha is converted by partial oxidation into a second crude synthesis gas and in a reactor of the naphtha POX the substantially water-free naphtha/soot mixture is introduced as feed from the decanter.

6. The device according to claim 5, wherein soot-loaded waste water from the naphtha POX is introduced into the mixing appliance and there, together with the soot-loaded waste water from the heavy oil POX, is mixed with naphtha.

7. The device according to claim 5, further having a storage appliance for temporary storage of a part of the naphtha/soot mixture which, owing to a temporary performance reduction of the naphtha POX, cannot be introduced as feed into the reactor of the naphtha POX.

8. A process for utilization of soot from waste water of a heavy oil POX, comprising the steps of:

mixing soot-loaded waste water from the heavy oil POX with naphtha;

providing the mixed soot-loaded waste water and naphtha to a decanter;

removing a substantially soot-free water fraction and a substantially water-free naphtha/soot mixture separately from the decanter; and feeding the substantially water-free naphtha/soot mixture as feed to a reactor of a naphtha POX.

9. The process according to claim 8, further comprising the steps of:

mixing soot-loaded waste water from the naphtha POX with the mixed soot-loaded waste water from the heavy oil POX and the naphtha; and providing the mixed soot-loaded waste water from the naphtha POX, the soot-loaded waste water from the heavy oil POX, and the naphtha to the decanter.

10. The process according to claim 8, further comprising the steps of:
- mixing soot-loaded waste water from the naphtha POX with naphtha;
- providing the mixed soot-loaded waste water from the naphtha POX and the naphtha to a second decanter;
- removing a substantially soot-free water fraction and a substantially water-free naphtha/soot mixture separately from the second decanter; and
- feeding the substantially water-free naphtha/soot mixture from the second decanter as feed to the reactor of the naphtha POX.

11. The process according to claim 8, further comprising the step of storing a part of the substantially water-free naphtha/soot mixture from the decanter prior to the step of feeding the substantially water-free naphtha/soot mixture as feed to the reactor of the naphtha POX in response to a temporary performance reduction of the naphtha POX.

12. The process according to claim 11, further comprising the step of feeding the stored part of the substantially water-free naphtha/soot mixture into the reactor of the naphtha POX when operating conditions of the naphtha POX permit.

* * * * *